(12) United States Patent
Baro Cabrero

(10) Patent No.: US 9,719,543 B2
(45) Date of Patent: Aug. 1, 2017

(54) ADAPTER DEVICE FOR CERAMIC CUTTING MACHINES

(71) Applicant: BELLOTA HERRAMIENTAS, S.A., Legazpia (Guipuzcoa) (ES)

(72) Inventor: Josep Baro Cabrero, Legazpia (ES)

(73) Assignee: BELLOTA HERRAMIENTAS, S.A., Legazpia (Guipuzcoa) (ES)

( * ) Notice: Subject to any disclaimer, the term of this patent is extended or adjusted under 35 U.S.C. 154(b) by 369 days.

(21) Appl. No.: 14/489,573

(22) Filed: Sep. 18, 2014

(65) Prior Publication Data
US 2015/0086291 A1 Mar. 26, 2015

(30) Foreign Application Priority Data
Sep. 20, 2013 (ES) .................... 201331370

(51) Int. Cl.
*B23B 31/20* (2006.01)
*F16B 13/06* (2006.01)
*B28D 1/22* (2006.01)

(52) U.S. Cl.
CPC ............ *F16B 13/063* (2013.01); *B23B 31/20* (2013.01); *B28D 1/226* (2013.01); *B23B 2231/2005* (2013.01); *B23B 2231/2078* (2013.01); *B23B 2231/2097* (2013.01); *Y10T 279/17427* (2015.01); *Y10T 279/3406* (2015.01)

(58) Field of Classification Search
CPC ................ B23B 31/20; B23B 31/1177; B23B 2231/2078; B23B 2231/2089; B23B 2231/2097; B23B 2231/2005; F16B 13/063; B28D 1/226; Y10T 279/3406; Y10T 279/17427; Y10T 279/17324; Y10T 279/17444; Y10T 279/17351
USPC ............................................ 411/72
See application file for complete search history.

(56) References Cited

U.S. PATENT DOCUMENTS

| | | | | |
|---|---|---|---|---|
| 2,626,667 A | * | 1/1953 | Spiller | B23B 31/20 279/46.3 |
| 3,832,931 A | * | 9/1974 | Talan | F16B 13/126 411/56 |
| 4,233,881 A | * | 11/1980 | Carrier | F16B 13/12 411/50 |
| 4,278,006 A | * | 7/1981 | Lobello | F16B 13/066 405/259.3 |
| 4,488,843 A | * | 12/1984 | Achille | F16B 19/1081 411/385 |
| 4,753,559 A | * | 6/1988 | Pentesco | B21D 35/00 405/259.3 |

(Continued)

*Primary Examiner* — Eric A Gates
(74) *Attorney, Agent, or Firm* — Wenderoth, Lind & Ponack, L.L.P.

(57) ABSTRACT

An adapter device for ceramic cutting machines (2) that includes an adapter plug (1) for the hole (8) of the tool holder (7) of a ceramic cutting machine (2. The plug (1) includes a hollow cylindrical shape with a stop (12) that performs an axial fixation in a direction of the plug (1) in the hole (8) of a tool holder (7) of the ceramic cutting machine (2); and a longitudinal slot (13) that leaves open the inner hollow space of the plug (1) along its entire length. The longitudinal slot (13) has a narrower segment in a part of the plug (1) that is nearest the end (21) having the stop (12), and a wider segment in the part of the plug (1) that is near the end (22) of the plug (1) opposite the stop (12).

14 Claims, 5 Drawing Sheets

(56) References Cited

U.S. PATENT DOCUMENTS

| | | | | |
|---|---|---|---|---|
| 4,840,523 A * | 6/1989 | Oshida | ............... | F16B 19/1081 |
| | | | | 411/48 |
| 4,896,892 A * | 1/1990 | Andrews | ............ | B23B 31/1075 |
| | | | | 279/145 |
| 4,958,966 A * | 9/1990 | Andrews | ............ | B23B 31/1075 |
| | | | | 279/143 |
| 7,278,640 B2 * | 10/2007 | Allan | .................. | B23B 31/1173 |
| | | | | 279/79 |
| 7,484,736 B2 * | 2/2009 | Allemann | ................ | B24D 5/16 |
| | | | | 279/143 |
| 8,672,592 B2 * | 3/2014 | Guy | ..................... | B23B 31/202 |
| | | | | 279/42 |
| 8,974,358 B2 * | 3/2015 | Shih | .................. | B23Q 11/0067 |
| | | | | 279/43.8 |

* cited by examiner

ADAPTER DEVICE FOR CERAMIC CUTTING MACHINES

OBJECT OF THE INVENTION

The present invention relates to an adapter device for ceramic cutting machines that comprises a plug that is inserted into the hole intended for the placement of the cutting tools (also known as "scoring wheels") in the tool holders of conventional manual ceramic cutting machines.

The invention is applicable to the field of the metal tool manufacturing industry, the plastic manufacturing industry and the ceramics industry.

BACKGROUND AND TECHNICAL PROBLEM TO BE SOLVED

Current ceramic cutting machines that are manually operated typically comprise a bench where the tile or ceramic piece to be cut is placed, a positioning element of said tile in the bench and a lever that slides on rails, having a tool holder element wherein a cutting tool (commonly known as "scoring wheel") is inserted, which is in turn formed by a handle and a cutting blade (commonly known as "scoring blade"). By means of the pressure exerted by the lever, a certain pressure is exerted by the cutting tool on the tile to be cut. While exerting said pressure, and by advancing the lever along its rails with its tool holder, a cut is progressively made in the tile.

Many ceramic cutting machine models currently exist, each with its own characteristic design. One point in which the variation of design occurs the most among the different ceramic cutting machines is the shape of the hole existing in the aforementioned tool holders, the hole through which the aforementioned scoring wheels are inserted. Said shape of the hole of the tool holder means that in a certain ceramic cutting machine, only a certain type of scoring wheel can be installed despite the existence of a great variety thereof in the market. Therefore, once a certain ceramic cutting machine is acquired, the user thereof is forced to always acquire scoring wheels of the same type when they need to be replaced due to wear of the blade (or scoring blade) or when the scoring wheel breaks.

The present invention presents an adapter device for ceramic cutting machines that comprises a plug that is inserted in the holes of tool holders of conventional manual ceramic cutting machines having a shape such that it allows the adaptation thereof to different types of holes of tool holders and different types of cutting tools (or scoring wheels), such that with the same ceramic cutting machine the user is able to use different types of scoring wheels with different shapes, thereby increasing the freedom of choice of the users of these machines among different types of scoring wheels.

DESCRIPTION OF THE INVENTION

The present invention describes an adapter device for ceramic cutting machines that comprises an adapter plug of the hole of the tool holder of a ceramic cutting machine.

The plug comprises a hollow cylindrical shape with a stop in one of the ends thereof consisting of a circular, sheetlike surface, projected towards the exterior of the plug, said stop performing an axial fixation in a direction of the plug in the hole of a tool holder of a ceramic cutting machine, said stop preventing the plug from giving in and falling from the side of the tool holder opposite the side through which it is introduced into the tool holder.

The plug also comprises a longitudinal slot that leaves open the inner hollow space of the plug in its entire length, said longitudinal slot comprising a narrower segment in the part of the plug that is nearest the end that comprises the stop, and a wider segment in the part of the plug that is near the end of the plug opposite the stop.

The wider part of the longitudinal slot is laterally delimited by two straight segments, which are the natural continuation, with no ridges or abrupt cuts, of the upper cylindrical surface of the plug.

According to a first embodiment of the adapter device for ceramic cutting machines, the length of the narrower part of said longitudinal slot is typically greater than the length of the wider part of said longitudinal slot.

According to a second embodiment of the adapter device for ceramic cutting machines, the length of the narrower part of said longitudinal slot is typically smaller than the length of the wider part of said longitudinal slot.

The longitudinal slot allows the plug to deform, reducing the diameter thereof to facilitate a smooth introduction into the hole of the tool holder.

The plug comprises two lateral slots, diametrically opposed, that leave open the inner hollow space of the plug and begin on the end of the plug that comprises the stop and are respectively located 90° to the left and 90° to the right of the longitudinal slot.

These lateral slots of the plug comprise a smaller width than the width of the narrower part of the longitudinal slot and a length equal to the length of the narrower part of said longitudinal slot.

Said lateral slots adapt the outer shape of the plug to the shape of a tool holder hole of a ceramic cutting machine with the insertion, in said lateral slots, of notches conventionally existing in the holes of the tool holders of the ceramic cutting machines.

The outer surface of the plug comprises a plurality of grooves and annular ribs, which are concentric with the axis of the cylindrical shape of the plug, said ribs performing an axial fixation of the plug inside the hole of the tool holder, where the space between each two of said ribs comprises holes in a part of the perimeter of the plug near the straight segments delimiting the wide part of the longitudinal slot, such that said holes leave open the inner hollow space of the plug.

The plug comprises a lateral truncation, produced by a cutting plane parallel to the axis of the cylindrical shape of the plug, said truncation producing an opening of the inner hollow space of the plug, a fixation element being introduced through said opening typically existing in the tool holders of conventional ceramic cutting machines, which produces a tightening between the cutting tool and the tool holder. Said fixation element is typically the threaded end of the handle of the ceramic cutting machine by means of which said handle is screwed to the tool holder.

According to the first embodiment of the adapter device for ceramic cutting machines object of the present invention, the length of said lateral truncation ranges from the upper end of the plug comprising the stop to the lower end of the plug.

According to the second embodiment of the adapter device for ceramic cutting machines object of the present invention, the length of said lateral truncation ranges from the upper end of the plug comprising the stop to approximately half the length of the plug.

At the end of the plug that comprises the stop there is a tooth oriented towards the inner hollow space of the plug, the purpose of which is to place and correctly affix the cutting tool inside the plug.

According to the second embodiment of the adapter device for ceramic cutting machines object of the present invention, the device comprises a washer that performs the fixation of both the plug to the tool holder of the ceramic cutting machine and of the cutting tool to the plug.

The washer of the adapter device for ceramic cutting machines object of the present invention comprises a disc shape with a protrusion in one of its two faces, with a shape such that it adapts to the longitudinal slot of the plug, specifically to the narrower part of said longitudinal slot, said washer performing, upon being introduced through the end of the plug opposite the stop, a retaining of the plug in the tool holder through the tightening and fitting of the protrusion into the longitudinal slot of the plug.

The inner hollow space of the plug typically comprises an octagon-shaped section, which is concentric with respect to the outer cylindrical surface of the plug.

BRIEF DESCRIPTION OF THE FIGURES

The present description shall be better understood based on the following figures.

Figure 1:
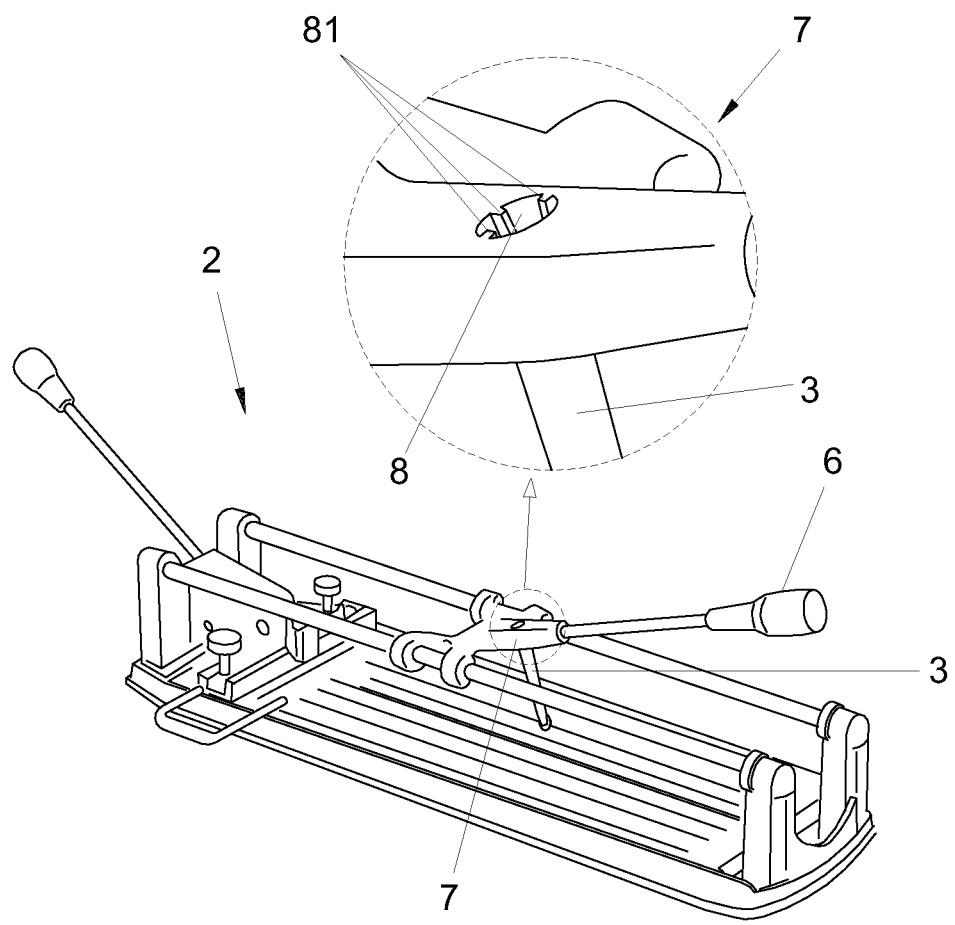
FIG. 1: ceramic cutting machine with a detail of the hole for cutting tool, wherein the adapter device for ceramic cutting machines object of the present invention is installed.

A list of the references used in the figures is provided below:
1. Plug.
2. Ceramic cutting machine.
3. Cutting tool.
4. Handle of the cutting tool.
5. Blade.
6. Handle.
7. Tool holder.
8. Hole of the tool holder.
11. Washer.
12. Stop.
13. Slot.
14. Straight segments.
15. Slots.
16. Ribs.
17. Holes
18. Lateral truncation.
19. Tooth.
20. Protrusion.
21. Upper end.
22. Lower end.
23. Cylindrical surface.
24. Axis.
25. Grooves.
81. Notches.

DETAILED DESCRIPTION

The present invention relates to an adapter device for ceramic cutting machines (2) that comprises an adapter plug (1) of the hole (8) of the tool holder (7) of a ceramic cutting machine (2) for the cutting tool (3) used in said machines (2).

FIG. 1 shows a perspective view of a ceramic cutting machine (2) model wherein a tilting lever (6) that incorporates its respective tool holder (7) can be observed. These pieces are common to the majority of manual ceramic cutting machines (2). This figure also shows a detail view of the hole (8) of the tool holder (7) intended for the insertion of a cutting tool (3), commonly known as "scoring wheel".

Figure 2A:
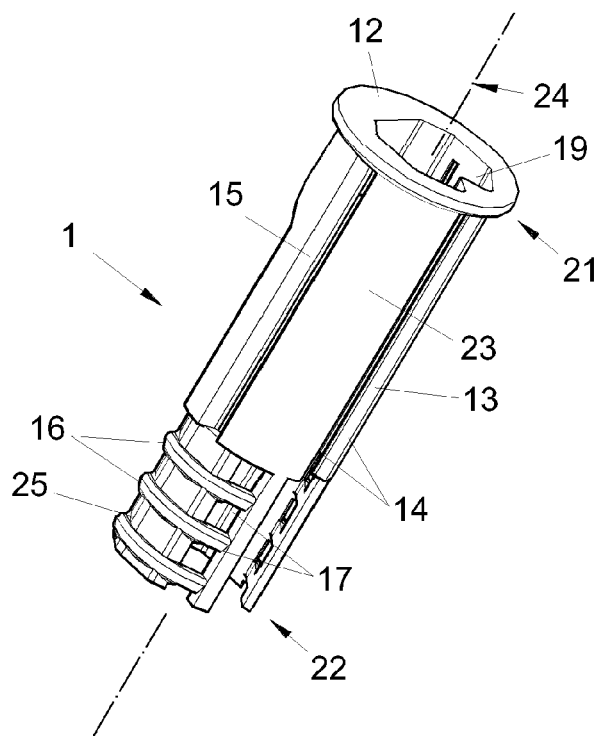
FIG. 2*a*: frontal perspective of a first embodiment of the adapter device for ceramic cutting machines object of the present invention.
Figure 2B:
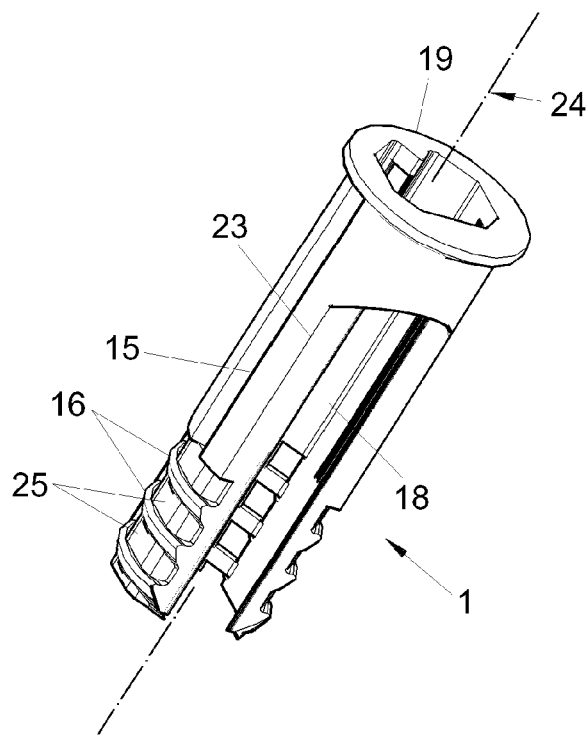
FIG. 2*b*: lateral perspective of a first embodiment of the adapter device for ceramic cutting machines object of the present invention.
Figure 3:
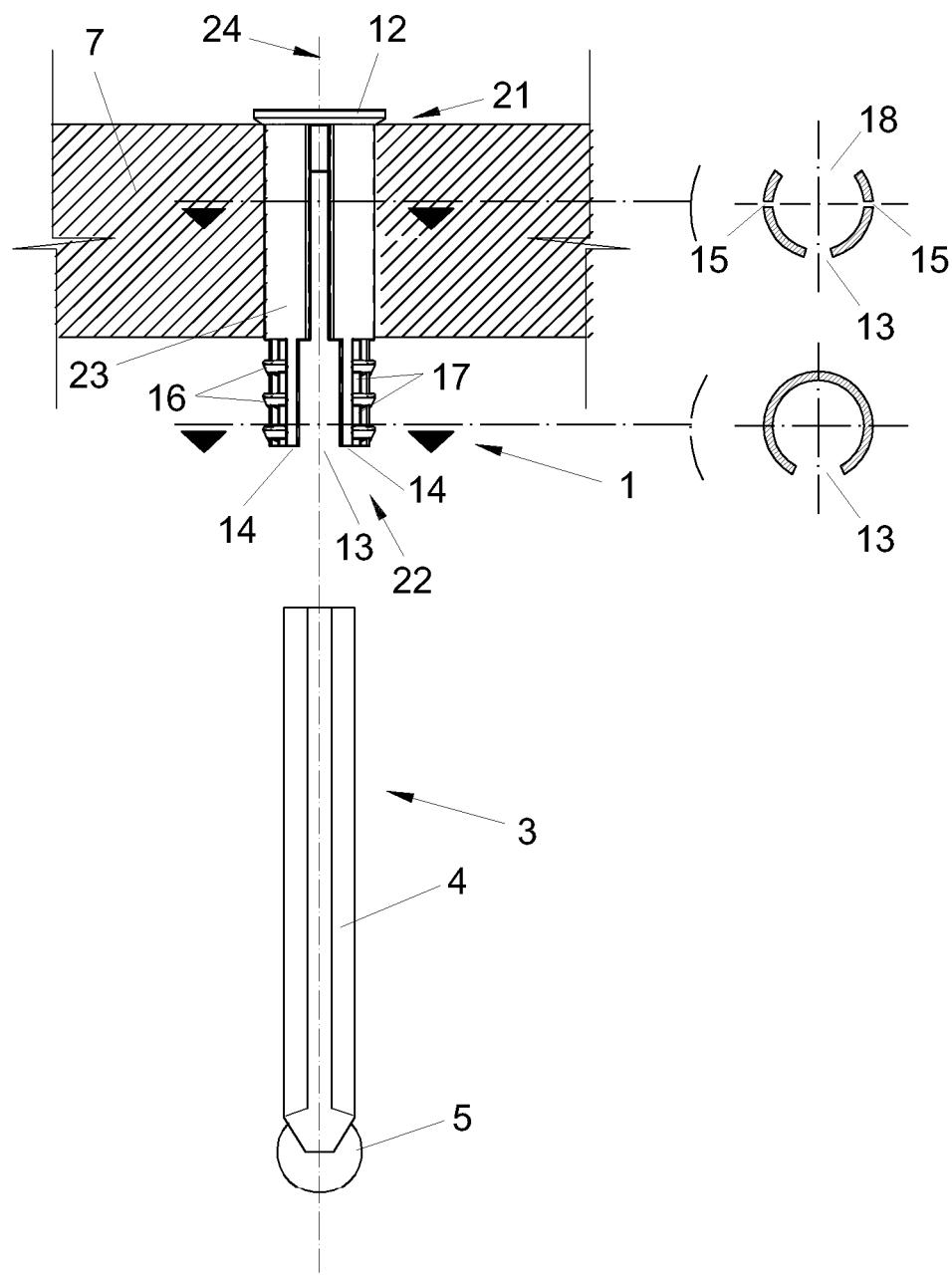
FIG. 3: assembly view of the cutting tool and of the adapter device for ceramic cutting machines object of the present invention according to a first embodiment of said device in the tool holder of the ceramic cutting machine.

FIGS. 2*a*, 2*b* and 3 represent a first embodiment of the adapter device for ceramic cutting machines (2) object of the present invention.

Figure 4A:
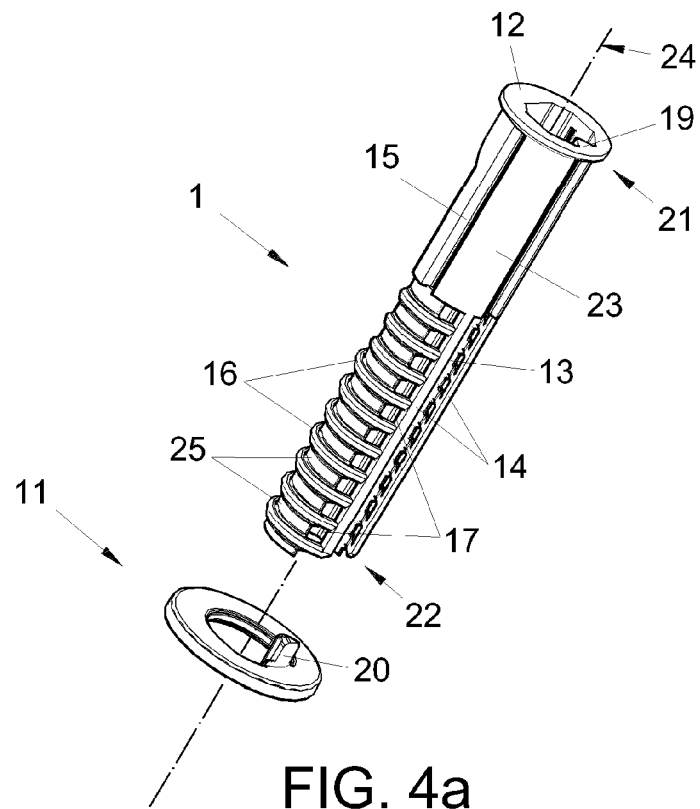
FIG. 4*a*: frontal perspective of a second embodiment of the adapter device for ceramic cutting machines object of the present invention.
Figure 4B:
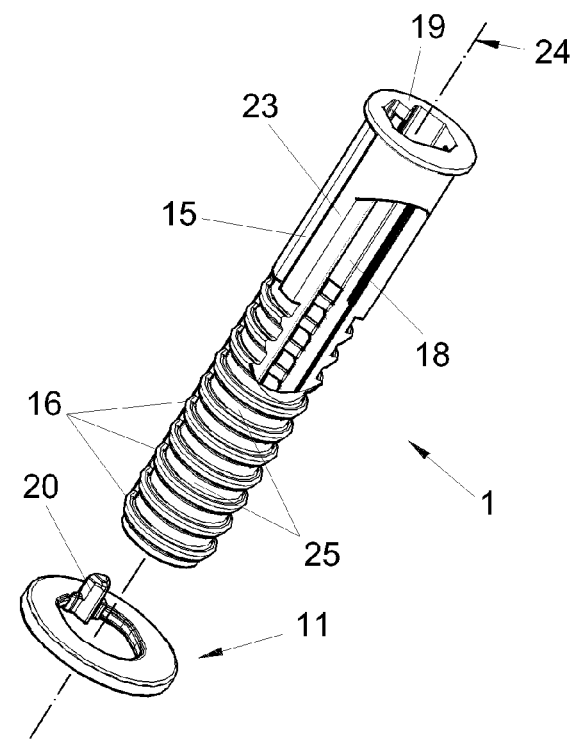
FIG. 4*b*: lateral perspective of a second embodiment of the adapter device for ceramic cutting machines object of the present invention.
Figure 5:
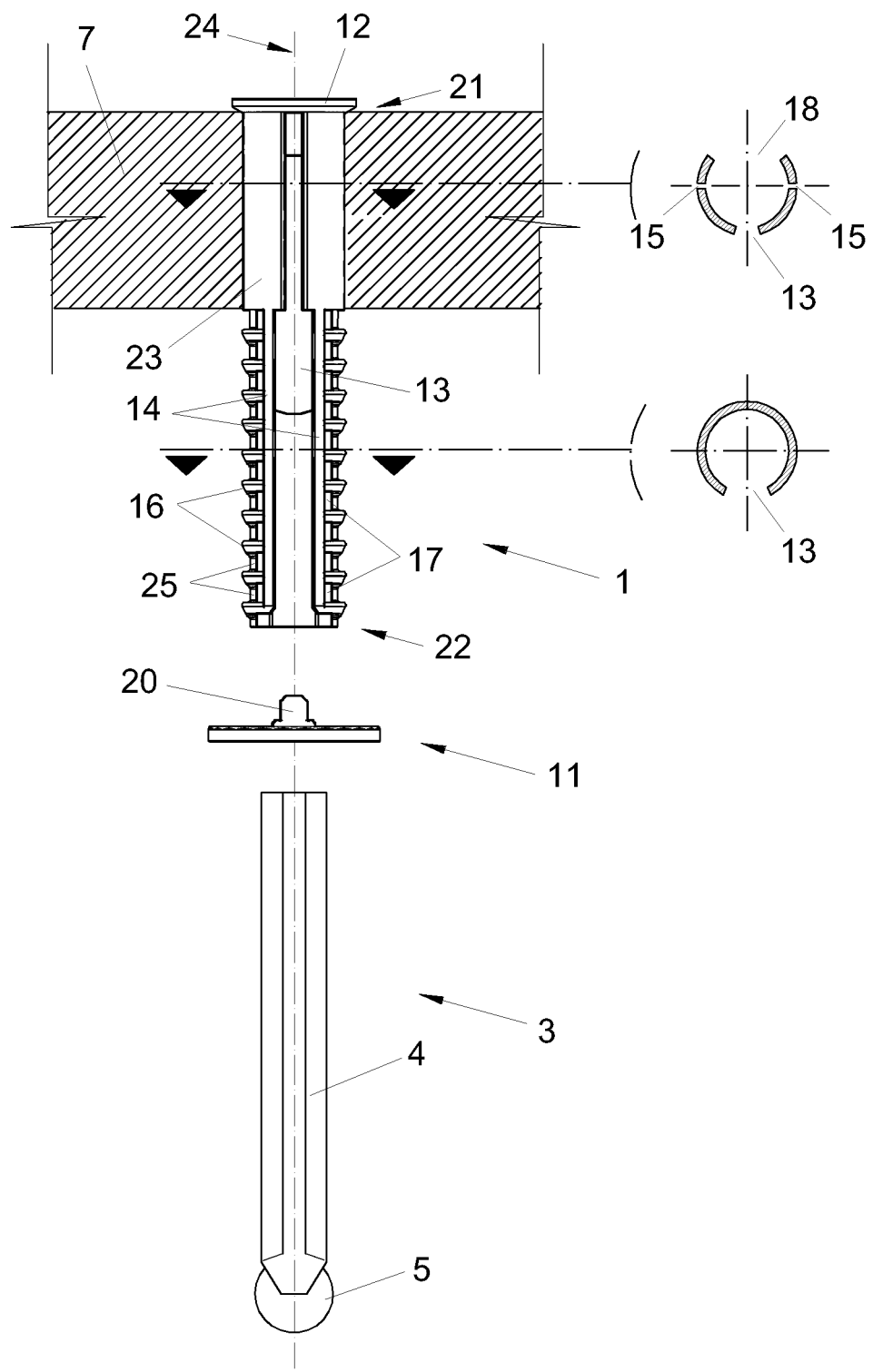
FIG. 5: assembly view of the cutting tool and of the adapter device for ceramic cutting machines object of the present invention according to a second embodiment of said device in the tool holder of the ceramic cutting machine.

FIGS. 4*a*, 4*b* and 5 represent a second embodiment of the adapter device for ceramic cutting machines (1) object of the present invention.

According to the second embodiment of the adapter device for ceramic cutting machines (2) object of the present invention, said device also comprises, in addition to the plug (1), a washer (11), where said washer (11) performs the fixation of both the plug (1) to the tool holder (7) and of the cutting tool (3) to the plug (1).

FIGS. 2*a* and 2*b* show a frontal perspective view and a lateral perspective view of an embodiment of the plug (1) of the device object of the present invention. These figures show the peculiar shape of said plug (1), which comprises several grooves (25), protrusions (16), slots (13, 15) and holes (17) intended to improve the grip and adaptation thereof to different types of tool holders (7) of ceramic cutting machines (2) and to the different types of cutting tools (3).

FIG. 3 shows the plug (1) inside the hole (8) of the tool holder (7) of the ceramic cutting machine (2); the cutting tool (3) is introduced into said hole (8) of the tool holder (7) with the insertion of the plug (1), which performs the adaptation of the cutting tool (3) to the tool holder (7).

The plug (1) has a hollow cylindrical shape with an outer cylindrical surface (23) and a stop (12) on one of its ends (21), considered its upper end, said stop (12) consisting of a circular, sheetlike surface projected towards the exterior of said plug (1), which allows the correct axial fixation in a direction of the plug (1) in the hole (8) of the tool holder (7), preventing the plug (1) from giving in and falling from the side of the tool holder (7) opposite the side through which it is introduced.

The plug (1) comprises, in its lateral surface, a longitudinal slot (13) that leaves open the inner hollow space of the plug (1) in its entire length. Said longitudinal slot (13) is narrower in the part of the plug (1) that is nearest the end (21) that comprises the stop (12), and wider in the part of the plug (1) that is near the end (22) opposite the stop (12). This wider part of the longitudinal slot (13) is laterally delimited by two straight segments (14), which are the natural continuation (with no ridges or abrupt cuts) of the outer cylindrical surface (23) of the plug (1).

As shown in FIG. 2a, according to the first embodiment of the adapter device for ceramic cutting machines (2) object of the present invention, the length of the narrower part of said longitudinal slot (13) is typically greater than the length of the wide part of said longitudinal slot (13).

On the contrary, and as shown in FIG. 4a, according to the second embodiment of the adapter device for ceramic cutting machines (2) object of the present invention, the length of the narrower part of said longitudinal slot (13) is typically smaller than the length of the wide part of said longitudinal slot (13).

Said longitudinal slot (13) allows the plug (1) to deform, reducing its diameter to allow a smooth introduction into the hole (8) of the tool holder (7).

The plug (1) comprises two other lateral slots (15), diametrically opposed, which leave open the inner hollow space of the plug (1) and begin on the upper end (21) of the plug (1) and are located, respectively, 90° to the left and 90° to the right of the longitudinal slot (13), having a smaller width than the width of the narrow part of the longitudinal slot (13), and a length equal to the length of the narrow part of said longitudinal slot (13).

Said lateral slots (15) allow the outer shape of the plug (1) to adapt to the shape of the hole (8) of the tool holder (7), given that said hole (8) typically comprises notches (81) that adapt to the shape of the cutting tools (3) for which a ceramic cutting machine (2) has been specifically designed. This way, said notches (81) are introduced through the lateral slots (15) upon the introduction of the plug (1) into the hole (8) of the tool holder (7).

The plug (1) in turn comprises a plurality of grooves (25) and annular ribs (16) that are concentric with respect to the axis (24) of the cylindrical shape of the plug (1). Said ribs (16) comprise a sawtooth-shaped profile and ensure a perfect axial fixation of the plug (1) inside the hole (8) of the tool holder (7). Said ribs (16) are located on the outer surface of the plug (1) and are regularly spaced along a distance ranging from the end (22) of the plug (1) opposite the stop (12) to the point where the wider part of the longitudinal slot (13) ends. The space between each two of said ribs (16) comprises holes (17) in a part of the perimeter of the plug (1) near the straight segments (14) delimiting the wide part of the longitudinal slot (13), such that said holes (17) leave open the inner hollow space of the plug (1).

The plug (1) in turn comprises a lateral truncation (18) produced by a plane parallel to the axis (24) of the cylindrical shape of the plug (1) that leaves open the inner hollow space of the plug (1), covering a length that, according to the first embodiment of the adapter device for ceramic cutting machines (2), ranges from the upper end (21) of the plug (1) to the lower end (22) of the plug (1).

According to the second embodiment of the adapter device for ceramic cutting machines (2), the length covered by said lateral truncation (18) ranges from the upper end (21) of the plug (1) comprising the stop (12) to approximately half of the length of the plug (1).

The opening produced by said lateral truncation (18) allows the introduction of a fixation element typically existing in tool holders (7) of conventional ceramic cutting machines (2), which produces a tightening between the cutting tool (3) and the tool holder (7). Said fixation element (not shown in the figures) is typically the threaded end of the handle (6) of the ceramic cutting machine (2), by means of which said handle (6) is screwed to the tool holder (7).

The inner hollow space of the plug (1) has an octagon-shaped section, which is concentric with respect to the outer cylindrical surface (23) of the plug (1). In the upper end (21) comprising the stop (12) there is a tooth (19) oriented towards the inner hollow space of the plug (1), the purpose of which is to place and correctly affix the cutting tool (3) inside the plug (1).

As provided at the beginning of this detailed description, according to the second embodiment of the adapter device for ceramic cutting machines (2) object of the present invention, in order to correctly affix the plug (1) in the hole (8) of the tool holder (7), the adapter device for ceramic cutting machines (2) comprises a washer (11) that is introduced through the lower end (22) of the plug (1) and slides externally with respect to the plug (1), guided by the ribs (16) comprised in the plug (1). Said washer (11) comprises a protrusion (20) with a shape such that it adapts to the longitudinal slot (13) of the plug (1), specifically to the narrower part of said longitudinal slot (13).

The plug (1) is introduced through the upper part of the hole (8) of the tool holder (7) by pressing the lower part of the plug (1) comprising the ribs (16) slightly, which gives in, allowing the introduction of the plug (1) into the hole (8). The plug (1) is introduced up to the stop (12), which does not allow it to continue. When pressure is no longer exerted on the lower part of the plug (1), the ribs (16) of the plug (1) prevent the plug (1) from sliding upwards and falling from the tool holder (7) when downwards pressure is exerted due to the cutting process.

According to the second embodiment of the adapter device for ceramic cutting machines (2), after the introduction of the plug (1) into the hole (8) of the tool holder (7), the washer (11) is introduced through the lower end (22) of the plug (1) and it slides until it produces the tightening of the washer (11) against the tool holder (7), also tightening the plug (1) together and holding it in the tool holder (7).

The device described above allows, by means of the insertion of the plug (1) between the hole (8) of the tool holder (7) and the cutting tool (3), the use of at least two different types of cutting tools (3), said types of cutting tools (3) comprising different shapes, in the same manual ceramic cutting machine (2), said ceramic cutting machine (2) comprising a hole (8) of the tool holder (7) with a certain shape.

Without the use of the adapter device object of the present invention, the assembly in a ceramic cutting machine (2) of cutting tools (3) other than those for which the machine (2) has been designed would not be possible. With the adapter device for ceramic cutting machines (2) object of the present invention and thanks to the shape of the plug (1) comprising slots (13, 15), ribs (16) and lateral truncation (18), the correct adaptation among the plug (1), cutting tool (3) and ceramic cutting machine (2) is enabled.

The present invention should not be limited to the embodiments described herein. Other embodiments introducing small modifications to the device described herein can be made by experts in the art based on the present description. In consequence, the scope of the invention is defined in the following claims.

The invention claimed is:

1. An adapter device for a ceramic cutting machine having a tool holder and a hole formed in the tool holder, the adapter device comprising an adapter plug for the hole of the tool holder, the adapter plug comprising:
   a hollow cylindrical structure having a first end, a second end, and an upper cylindrical surface extending from the first end toward the second end, wherein the hollow cylindrical structure defines an inner hollow space;

a stop for axially fixing the adapter plug in the hole of the tool holder, the stop being disposed at the first end and defining a circular sheet-like surface; and a longitudinal slot that leaves open the inner hollow space of the plug along the entire length of the hollow cylindrical structure, the longitudinal slot including a narrower segment in a part of the plug that is nearest the first end comprising the stop, and a wider segment in a part of the plug that is near the second end opposite the stop, wherein the wider segment of the longitudinal slot is laterally delimited by two straight segments, which are continuations of the upper cylindrical surface of the plug, wherein the adapter plug further comprises two lateral diametrically-opposed slots that leave open the inner hollow space of the adapter plug, wherein the diametrically-opposed slots extend from the first end and are respectively located 90° to the left and 90° to the right of the longitudinal slot, and have a smaller width than the width of the narrower segment of the longitudinal slot and a length equal to the length of the narrower segment of the longitudinal slot, and wherein both of the lateral slots and the narrower segment of the longitudinal slot permit an outer shape of the adapter plug to be adapted to a shape of the hole of the tool holder upon insertion, in the lateral slots and in the narrower segment of the longitudinal slot, of projections provided in the hole of the tool holder.

2. The adapter device according to claim 1, wherein the adapter plug includes a lateral truncation produced by a cutting plane parallel to the axis of the hollow cylindrical structure, the truncation producing an opening of the inner hollow space of the adapter plug for receiving a fixation element in the tool holder, the fixation element producing a tightening between the cutting tool and the tool holder, where the fixation element is a threaded end of a handle of the ceramic cutting machine by means of which the handle is screwed to the tool holder.

3. The adapter device according to claim 2, wherein the lateral truncation covers a length ranging from the first end of the adapter plug to the second end of the adapter plug.

4. The adapter device according to claim 2, wherein the lateral truncation covers a length ranging from the first end of the adapter plug to approximately half the total length of the adapter plug.

5. The adapter device according to claim 2, wherein the inner hollow space of the adapter plug comprises an octagon-shaped section, which is concentric with respect to the outer cylindrical surface of the adapter plug.

6. The adapter device according to claim 1, further comprising a tooth provided at the first end of the plug that comprises the stop, wherein the tooth is oriented towards the inner hollow space of the plug, and the tooth is adapted to place and correctly affix the cutting tool inside the plug.

7. The adapter device according to claim 6, wherein the inner hollow space of the adapter plug comprises an octagon-shaped section, which is concentric with respect to the outer cylindrical surface of the adapter plug.

8. The adapter device according to claim 1, wherein the inner hollow space of the plug comprises an octagon-shaped section, which is concentric with respect to the outer cylindrical surface of the plug.

9. The adapter device according to claim 1, wherein a length of the narrower part of the longitudinal slot is greater than a length of the wider part of the longitudinal slot.

10. The adapter device according to claim 1, wherein a length of the narrower part of the longitudinal slot is smaller than or equal to a length of the wider part of the longitudinal slot.

11. The adapter device according to claim 1, wherein the inner hollow space of the adapter plug comprises an octagon-shaped section, which is concentric with respect to the outer cylindrical surface of the adapter plug.

12. An adapter device for a ceramic cutting machine having a tool holder and a hole formed in the tool holder, the adapter device comprising an adapter plug for the hole of the tool holder, the adapter plug comprising:

a hollow cylindrical structure having a first end, a second end, and an upper cylindrical surface extending from the first end toward the second end, wherein the hollow cylindrical structure defines an inner hollow space;

a stop for axially fixing the adapter plug in the hole of the tool holder, the stop being disposed at the first end and defining a circular sheet-like surface; and a longitudinal slot that leaves open the inner hollow space of the plug along the entire length of the hollow cylindrical structure, the longitudinal slot including a narrower segment in a part of the plug that is nearest the first end comprising the stop, and a wider segment in a part of the plug that is near the second end opposite the stop, wherein the wider segment of the longitudinal slot is laterally delimited by two straight segments, which are continuations of the upper cylindrical surface of the plug, wherein the outer surface of the adapter plug includes a plurality of grooves and annular ribs which are concentric with respect to an axis of the adapter plug, the ribs performing an axial fixation of the adapter plug inside the hole of the tool holder, wherein holes are provided in spaces between adjacent ribs, and the holes are located in a part of the adapter plug near the straight segments delimiting the wider segment of the longitudinal slot such that the holes leave open the inner hollow space of the adapter plug.

13. The adapter device according to claim 12, wherein the inner hollow space of the adapter plug comprises an octagon-shaped section, which is concentric with respect to the outer cylindrical surface of the adapter plug.

14. An adapter device for a ceramic cutting machine having a tool holder and a hole formed in the tool holder, the adapter device comprising an adapter plug for the hole of the tool holder, the adapter plug comprising:

a hollow cylindrical structure having a first end, a second end, and an upper cylindrical surface extending from the first end toward the second end, wherein the hollow cylindrical structure defines an inner hollow space;

a stop for axially fixing the adapter plug in the hole of the tool holder, the stop being disposed at the first end and defining a circular sheet-like surface;

a longitudinal slot that leaves open the inner hollow space of the plug along the entire length of the hollow cylindrical structure, the longitudinal slot including a narrower segment in a part of the plug that is nearest the first end comprising the stop, and a wider segment in a part of the plug that is near the second end opposite the stop; and a washer that performs a fixation of both the adapter plug to the tool holder and of the cutting tool to the adapter plug, wherein the wider segment of the longitudinal slot is laterally delimited by two straight segments, which are continuations of the upper cylindrical surface of the plug, wherein the washer has a disc shape with a protrusion projecting from one face of the washer, the protrusion having a shape adapted to be received in the narrower part of the longitudinal slot, wherein the washer retains, upon being introduced through the second end of the plug, the adapter plug in the tool holder through tightening and fitting of the protrusion in the longitudinal slot of the adapter plug.

\* \* \* \* \*